United States Patent
Erhart et al.

(10) Patent No.: US 8,405,484 B2
(45) Date of Patent: Mar. 26, 2013

(54) MONITORING RESPONSIVE OBJECTS IN VEHICLES

(75) Inventors: George William Erhart, Loveland, CO (US); Valentine C. Matula, Granville, OH (US); David Joseph Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 918 days.

(21) Appl. No.: 12/240,256

(22) Filed: Sep. 29, 2008

(65) Prior Publication Data

US 2010/0079256 A1  Apr. 1, 2010

(51) Int. Cl.
*G08C 19/00* (2006.01)
*H04Q 9/00* (2006.01)
*H04B 1/59* (2006.01)

(52) U.S. Cl. .............. 340/5.61; 340/8.1; 455/456.1

(58) Field of Classification Search ............ 235/383, 235/348, 385; 340/5.1, 6.1, 6.11, 8.1, 501, 340/505, 517, 521–522, 531, 539.1, 539.22, 340/539.26–539.32, 540, 584–589, 601–602, 340/665, 673, 686.1, 5.61; 342/42; 455/423, 455/456.1; 701/29, 32, 36
See application file for complete search history.

(56) References Cited

U.S. PATENT DOCUMENTS

| | | | |
|---|---|---|---|
| 5,857,152 A | 1/1999 | Everett | |
| 5,873,095 A | 2/1999 | Gore | |
| 5,959,568 A | 9/1999 | Woolley | |
| 6,236,911 B1 * | 5/2001 | Kruger | 701/1 |
| 6,255,942 B1 * | 7/2001 | Knudsen | 340/506 |
| 6,510,380 B1 | 1/2003 | Curatolo et al. | |
| 6,612,488 B2 | 9/2003 | Suzuki | |
| 6,736,322 B2 | 5/2004 | Gobburu et al. | |
| 6,804,606 B2 | 10/2004 | Jones | |
| 6,845,362 B2 | 1/2005 | Furuta et al. | |

(Continued)

FOREIGN PATENT DOCUMENTS

| CN | 1898688 | 1/2007 |
|---|---|---|
| EP | 967764 A2 * | 12/1999 |

(Continued)

OTHER PUBLICATIONS

Joseph, Tonya S., "U.S. Appl. No. 12/328,620 Office Action Jan. 7, 2011",, Publisher: USPTO, Published in: US.

(Continued)

*Primary Examiner* — Benjamin C Lee
*Assistant Examiner* — Stephen Burgdorf
(74) *Attorney, Agent, or Firm* — Sheridan Ross P.C.

(57) ABSTRACT

A vehicle for carrying responsive objects is outfitted with a proxy for the responsive objects. The vehicle is also outfitted with a sensor that detects which responsive objects it is carrying and sensor that detect environmental conditions (e.g., temperature, humidity, barometric pressure, etc.) inside and outside of the vehicle. When an inquiry is directed to a responsive object in the vehicle, the proxy intercepts the inquiry and responds with the status of the vehicle. In accordance with the illustrative embodiment, the responsive objects use different protocols, and the proxy is multi-lingual in the sense that it can communicate with the inquirer with the same protocol that is used to communicate with the responsive object. In this way, the illustrative embodiment provides a mechanism for monitoring the location and condition of responsive without some of the costs and disadvantages for doing so in the prior art.

7 Claims, 2 Drawing Sheets

U.S. PATENT DOCUMENTS

| | | | |
|---|---|---|---|
| 6,847,620 B1* | 1/2005 | Meier | 370/328 |
| 6,915,205 B2 | 7/2005 | Kim et al. | |
| 6,919,803 B2* | 7/2005 | Breed | 340/539.14 |
| 6,972,682 B2* | 12/2005 | Lareau et al. | 340/568.1 |
| 7,065,244 B2 | 6/2006 | Akimov et al. | |
| 7,212,806 B2 | 5/2007 | Karaoguz | |
| 7,277,915 B2* | 10/2007 | de Boor et al. | 709/203 |
| 7,283,846 B2 | 10/2007 | Spriestersbach et al. | |
| 7,403,744 B2* | 7/2008 | Bridgelall | 455/41.2 |
| 7,486,943 B2 | 2/2009 | Choti et al. | |
| 7,652,568 B2* | 1/2010 | Waugh et al. | 340/538.15 |
| 7,929,954 B2 | 4/2011 | Choti et al. | |
| 8,103,250 B2 | 1/2012 | Sullivan et al. | |
| 8,219,449 B2* | 7/2012 | Bertin et al. | 705/16 |
| 2002/0042266 A1 | 4/2002 | Heyward et al. | |
| 2002/0045971 A1 | 4/2002 | Banas | |
| 2002/0052786 A1 | 5/2002 | Kim et al. | |
| 2003/0018613 A1 | 1/2003 | Oytac | |
| 2003/0130893 A1 | 7/2003 | Farmer | |
| 2003/0137968 A1* | 7/2003 | Lareau et al. | 370/349 |
| 2004/0004117 A1 | 1/2004 | Suzuki | |
| 2004/0019542 A1 | 1/2004 | Fuchs et al. | |
| 2004/0078209 A1 | 4/2004 | Thomson | |
| 2004/0078332 A1 | 4/2004 | Ferguson et al. | |
| 2004/0082296 A1 | 4/2004 | Twitchell, Jr. | |
| 2004/0178880 A1* | 9/2004 | Meyer et al. | 340/5.22 |
| 2004/0203377 A1* | 10/2004 | Eaton et al. | 455/41.2 |
| 2004/0252729 A1* | 12/2004 | Shinoda et al. | 370/546 |
| 2005/0030939 A1* | 2/2005 | Roy et al. | 370/352 |
| 2005/0162270 A1* | 7/2005 | Lambright et al. | 340/539.1 |
| 2005/0222999 A1 | 10/2005 | Nihei | |
| 2005/0234771 A1 | 10/2005 | Register et al. | |
| 2006/0155721 A1* | 7/2006 | Grunwald et al. | 707/100 |
| 2006/0200560 A1* | 9/2006 | Waugh et al. | 709/224 |
| 2006/0208873 A1* | 9/2006 | Lesesky et al. | 340/531 |
| 2006/0256812 A1* | 11/2006 | Qu et al. | 370/466 |
| 2006/0258367 A1 | 11/2006 | Chiang et al. | |
| 2006/0276960 A1 | 12/2006 | Adamczyk et al. | |
| 2007/0027806 A1 | 2/2007 | Sands et al. | |
| 2007/0073585 A1 | 3/2007 | Apple et al. | |
| 2007/0174390 A1 | 7/2007 | Silvain et al. | |
| 2007/0225912 A1 | 9/2007 | Grush | |
| 2007/0264974 A1 | 11/2007 | Frank et al. | |
| 2008/0083826 A1 | 4/2008 | Henry et al. | |
| 2008/0119160 A1 | 5/2008 | Andriantsiferana et al. | |
| 2008/0143484 A1 | 6/2008 | Twitchell | |
| 2008/0143516 A1 | 6/2008 | Mock et al. | |
| 2008/0167896 A1 | 7/2008 | Fast et al. | |
| 2008/0174485 A1 | 7/2008 | Carani et al. | |
| 2008/0231448 A1 | 9/2008 | Fowler et al. | |
| 2009/0165092 A1 | 6/2009 | McNamara | |
| 2009/0239667 A1 | 9/2009 | Rowe et al. | |
| 2009/0271270 A1 | 10/2009 | Regmi et al. | |
| 2010/0076777 A1 | 3/2010 | Paretti et al. | |
| 2010/0077484 A1 | 3/2010 | Paretti et al. | |
| 2010/0121567 A1 | 5/2010 | Mendelson | |
| 2010/0153171 A1 | 6/2010 | Erhart et al. | |
| 2010/0235218 A1 | 9/2010 | Erhart et al. | |
| 2011/0196714 A1 | 8/2011 | Erhart et al. | |
| 2011/0196724 A1 | 8/2011 | Fenton et al. | |
| 2011/0215902 A1 | 9/2011 | Brown, III et al. | |
| 2011/0252456 A1 | 10/2011 | Hatakeyama | |
| 2012/0058784 A1 | 3/2012 | Niemenmaa et al. | |

FOREIGN PATENT DOCUMENTS

| | | | |
|---|---|---|---|
| JP | 2007081566 A | * | 3/2007 |
| WO | 2005045718 A1 | | 0/5200 |
| WO | 9812504 A1 | | 3/1998 |
| WO | 02073546 A2 | | 9/2002 |
| WO | 2008151438 A1 | | 12/2008 |

OTHER PUBLICATIONS

Jedermann et al., "Transport Scenario for the Intelligent Container", "Understanding Autonomous Cooperation & Control in Logistics XP009129863", 2007, pp. 393-404, Publisher: Springer, Berlin.

Krafft, Gerald, "EP Application No. 09171160.6 Office Extended European Search Report Mar. 1, 2010", , Publisher: EPO, Published in: EP.

Hayes, John W., "U.S. Appl. No. 12/328,620 Panel Decision May 10, 2011", , Publisher: USPTO, Published in: US.

Schilit et al, "Context-Aware Computing Applications", "IEEE Workshop on Mobile Computing Systems and Applications", Dec. 8-9, 1994, Published in: US.

Abowd et al., "Cyberguide: A Mobile Context-Aware Tour Guide", Sep. 23, 1996, Publisher: Baltzer Journals, Published in: US.

Cheverst et al, "Developing a Context-aware Electronic Tourist Guide: Some Issues and Experiences", , Publisher: Mulitmedia Research Group, Published in: UK.

Cheverst et al., "Sharing (Location) Context to Facilitate Collaboration Between City Visitors", , Publisher: Multimedia Research Group, Published in: UK.

Chen, et al, "A Survey of Context-Aware Mobile Computing Research", "Dartmouth Computer Science Technical Report", Nov. 2000, pp. 116, vol. TR2000, No. 381, Published in: US.

Hole, Andrew, "GB Application No. 0822854.6 Search Report", Apr. 16, 2009, Publisher: IPO, Published in: GB.

McWhirter, David, "GB Application No. 0822852.0 Search Report", Mar. 31, 2009, Publisher: UK IPO, Published in: GB.

Poinvil, Frantzy, "U.S. Appl. No. 12/242,475 Office Action Sep. 7, 2010", , Publisher: USPTO, Published in: US.

Joseph, Tonya S., "U.S. Appl. No. 12/328,620 Office Action Aug. 19, 2010", , Publisher: USPTO, Published in: US.

Griffiths, Gareth, "GB Application No. GB0913222.6 Search Report Oct. 30, 2009", , Publisher: UK IPO, Published in: GB.

Poinvil, Frantzy, "U.S. Appl. No. 12/242,475 Office Action Dec. 20, 2010", , Publisher: US, Published in: US.

Restriction Requirementfor U.S. Appl. No. 12/702,764, mailed Jul. 12, 2012, 6 pages.

Official Action for U.S. Appl. No. 12/713,512, mailed Dec. 27, 2011, 16 pages.

Final Official Action for U.S. Appl. No. 12/713,512, mailed Jun. 18, 2012, 23 pages.

Official Action for U.S. Appl. No. 12/702,764, mailed Aug. 9, 2012, 13 pages.

Official Action for U.S. Appl. No. 12/784,369, mailed Oct. 4, 2012, 11 pages.

Official Action and Search Report for Chinese Patent Application No. 200910173321.0, mailed Jan. 14, 2013, 6 pages (English translation).

Final Action for U.S. Appl. No. 12/702,764, mailed Jan. 4, 2013, 18 pages.

* cited by examiner

MONITORING RESPONSIVE OBJECTS IN VEHICLES

FIELD OF THE INVENTION

The present invention relates to the field of surveillance in general, and, more particularly, to monitoring portable objects.

BACKGROUND OF THE INVENTION

There are some objects that can be shipped without a great deal of concern for whether the object is lost in transit or for whether the object's environment stays within acceptable limits. For example, a one-pound ingot of lead can be shipped without a great deal of concern for whether it is lost because the ingot can be easily and inexpensively replaced. Furthermore, the ingot is substantially impervious to damage from changes in temperature, humidity, and barometric pressure.

In contrast, there are some objects that can be shipped in which the owner of the object is highly interested in whether the object is lost and whether the object's environment stays within acceptable limits. In this case, the objects are often outfitted with radios, electronics, and sensors so that the owner can inquire into the location and condition of the object. The inquiries can originate from a location that is near the responsive object or from a location that is thousands of miles away from the object. In either case, a portable object that is capable of responding to an inquiry about itself is called a "responsive object."

When a responsive object is located outside, on land, and is stationary, the responsive object is usually able to receive and respond to an inquiry. In contrast, when a responsive object is inside a vehicle, far from land, or moving, the ability of the responsive object to receive and respond to inquiries can be impeded. Therefore, the need exists for an improvement in the ability to monitor the condition of responsive objects.

SUMMARY OF THE INVENTION

Some embodiments of the present invention provide a mechanism for monitoring the condition of responsive objects without some of the costs and disadvantages of techniques in the prior art. In accordance with the illustrative embodiment, a vehicle for carrying responsive objects is outfitted with a proxy for the responsive objects. The vehicle is also outfitted with a sensor that detects which responsive objects it is carrying and sensor that detect environmental conditions (e.g., temperature, humidity, barometric pressure, etc.) inside and outside of the vehicle.

When an inquiry is directed to a responsive object in the vehicle, the proxy intercepts the inquiry and responds with the status of the vehicle. In accordance with the illustrative embodiment, the responsive objects use different protocols, and the proxy is multi-lingual in the sense that it can communicate with the inquirer with the same protocol that is used to communicate with the responsive object. In this way, the illustrative embodiment provides a mechanism for monitoring the location and condition of responsive without some of the costs and disadvantages for doing so in the prior art.

The illustrative embodiment comprises: a vehicle; a first object capable of responding to a first inquiry about the state of the first object, wherein the first inquiry is formatted in accordance with a first protocol; a first sensor for sensing when the first object is within the vehicle; a second sensor for sensing a first state of the vehicle; and a proxy for responding to the first inquiry about the state of the first object with the state of the vehicle when the first object is within the vehicle.

DETAILED DESCRIPTION

Figure 1:
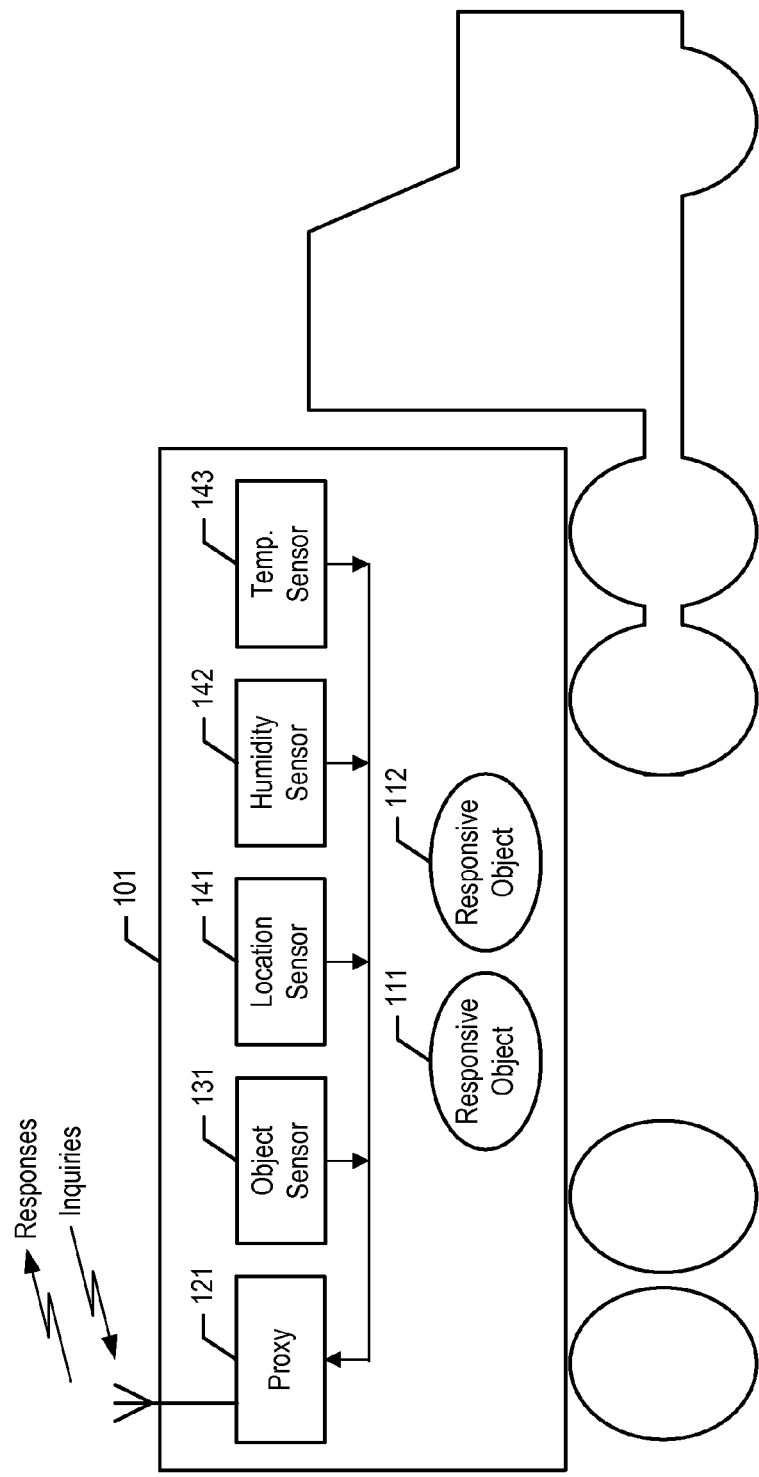
FIG. 1 depicts a schematic diagram of the salient components of transportation system 100 in accordance with the illustrative embodiment of the present invention.

FIG. 1 depicts a schematic diagram of the salient components of transportation system 100 in accordance with the illustrative embodiment of the present invention. Transportation system 100 comprises: vehicle 101, responsive object 111, responsive object 112, proxy 121, responsive object sensor 131, location sensor 141, temperature sensor 142, and humidity sensor 143.

In accordance with the illustrative embodiment, proxy 121 is within vehicle 101, but it will be clear to those skilled in the art, after reading this disclosure, how to make and use alternative embodiments of the present invention in which proxy 121 is outside of vehicle 101. In accordance with the illustrative embodiment, vehicle 101 comprises two responsive objects, but it will be clear to those skilled in the art, after reading this disclosure, how to make and use alternative embodiments of the present invention that comprise any number of responsive objects. In accordance with the illustrative embodiment, vehicle 101 comprises one temperature sensor, one location sensor, and one humidity sensor, but it will be clear to those skilled in the art, after reading this disclosure, how to make and use alternative embodiments of the present invention that comprise any number and kind of environmental sensors, such as, for example and without limitation, barometric sensors, light sensors, gravimetric sensors, etc.

Vehicle 101 is a truck for carrying responsive object 111 and responsive object 112. In accordance with the illustrative embodiment, vehicle 101 is a truck, but it will be clear to those skilled in the art, after reading this disclosure, how to make and use alternative embodiments of the present invention in which vehicle 101 is another mode of transportation, such as, for example and without limitation, a ship, an airplane, a train, etc. In any case, it will be clear to those skilled in the art how to make and use vehicle 101.

Responsive object 111 comprises:
  (i) a payload (not shown),
  (ii) a location sensor (not shown) for detecting the location of responsive object 111,
  (iii) a humidity sensor (not shown) for detecting the ambient humidity in the proximity of responsive object 111,
  (iv) a temperature sensor (not shown) for detecting the ambient temperature in the proximity of responsive object 111,
  (v) hardware and software (not shown) that is capable of responding to an inquiry about the state of responsive object 111 with information from the location sensor, the humidity sensor, and the temperature sensor.

In accordance with the illustrative embodiment, the inquiry is formatted in accordance with a first protocol. It will be clear to those skilled in the art how to make and use responsive object 111.

Responsive object 112 comprises:
  (i) a payload (not shown), (ii) a location sensor (not shown) for detecting the location of responsive object 112, (iii) a humidity sensor (not shown) for detecting the ambient humidity in the proximity of responsive object 112, (iv) a temperature sensor (not shown) for detecting the ambient temperature in the proximity of responsive object 112, (v) hardware and software (not shown) that is capable of responding to an inquiry about the state of responsive object 112 with information from the location sensor, the humidity sensor, and the temperature sensor.

In accordance the illustrative embodiment, the inquiry is formatted in accordance with a second protocol that is different from the first protocol. It will be clear to those skilled in the art, after reading this disclosure, how to make and use alternative embodiments of the present invention in which the first protocol and the second protocol are the same. In accordance with the illustrative embodiment, the hardware and software of responsive object 112 is the same as that in responsive object 111, but it will be clear to those skilled in the art, after reading this disclosure, how to make and use alternative embodiments of the present invention in which the hardware and software is different. It will be clear to those skilled in the art how to make and use responsive object 112.

Proxy 121 is hardware and software that intercepts and responds to inquiries directed to responsive object 111 and responsive object 112 for them because they are unable or unwilling to respond to the inquiries themselves while in vehicle 101. Proxy 121 receives input from responsive object sensor 131, location sensor 141, humidity sensor 142, and temperature sensor 143, which are described below. In accordance with the illustrative embodiment, proxy 121 is capable of responding to inquiries directed to responsive object 111 in accordance with the first protocol and to inquiries directed to responsive object 112 in accordance with the second protocol.

Responsive object sensor 131 is hardware and software for detecting the presence or absence of responsive object 111 inside of vehicle 101 and for detecting the presence or absence of responsive object 112 inside of vehicle 101. In accordance with the illustrative embodiment, responsive object sensor 131 comprises a single housing, but it would be clear to those skilled in the art how to make and use alternative embodiments of the present invention in which responsive object sensor 131 comprises multiple housings. Furthermore, in accordance with the illustrative embodiment, responsive object sensor 131 uses radio-frequency identification ("RFID") tags in well-known fashion, but it will be clear to those skilled in the art, after reading this disclosure, how to make and use alternative embodiments of the present invention in which responsive object sensor 131 is something else, such as and without limitation, an optical bar code system, etc. In accordance with the illustrative embodiment, responsive object sensor 131 is located inside vehicle 101, but it will be clear to those skilled in the art, after reading this disclosure, how to make and use alternative embodiments of the present invention in which responsive object sensor 131 is located outside of vehicle 101. It will be clear to those skilled in the art how to make and use responsive object sensor 131.

Location sensor 141 is a Global Positioning System receiver for detecting the geographic location of vehicle 101. Location sensor 141 acts as a proxy for the location sensors within responsive object 111 and responsive object 112, respectively. In accordance with the illustrative embodiment location sensor 141 is capable of detecting the latitude, longitude, and altitude of vehicle 101. Although location sensor 141 is a satellite positioning system receiver, it will be clear to those skilled in the art how to make and use alternative embodiments of the present invention in which location sensor 141 uses another technology, such as, for example and without limitation, network-based location systems based on triangulation and trilaterialization, etc. It will be clear to those skilled in the art how to make and use location sensor 141.

Humidity sensor 142 is hardware and software for detecting the humidity inside and outside vehicle 101. Humidity sensor 142 acts as a proxy for the humidity sensors within responsive object 111 and responsive object 112, respectively. Although humidity sensor 142 is depicted in FIG. 1 as comprising a single housing within vehicle 101, it would be clear to those skilled in the art, after reading this disclosure, how to make and use alternative embodiments of the present invention in which humidity sensor 142 is within vehicle 101. Furthermore, it will be clear to those skilled in the art, after reading this disclosure, how to make and use alternative embodiments of the present invention in which humidity sensor 142 comprises a plurality of housings. And still furthermore, it will be clear to those skilled in the art, after reading this disclosure, how to make and use alternative embodiments of the present invention in which humidity sensor 142 is a connection to a weather reporting service, such as, for example, http://www.weather.gov.

Temperature Sensor 143 is hardware for measuring the temperature inside and outside of vehicle 101. Temperature sensor 142 acts as a proxy for the temperature sensors within responsive object 111 and responsive object 112, respectively. Although temperature sensor 143 is depicted in FIG. 1 as comprising a single housing within vehicle 101, it will be clear to those skilled in the art, after reading this disclosure, how to make and use alternative embodiments of the present invention in which temperature sensor 143 is outside of vehicle 101. Furthermore, it will be clear to those skilled in the art, after reading this disclosure, how to make and use alternative embodiments of the present invention in which temperature sensor 143 comprises a plurality of housings. And still furthermore, it will be clear to those skilled in the art, after reading this disclosure, how to make and use alternative embodiments of the present invention in which temperature sensor 143 is a connection to a weather reporting service, such as, for example, http://www.weather.gov.

Figure 2:
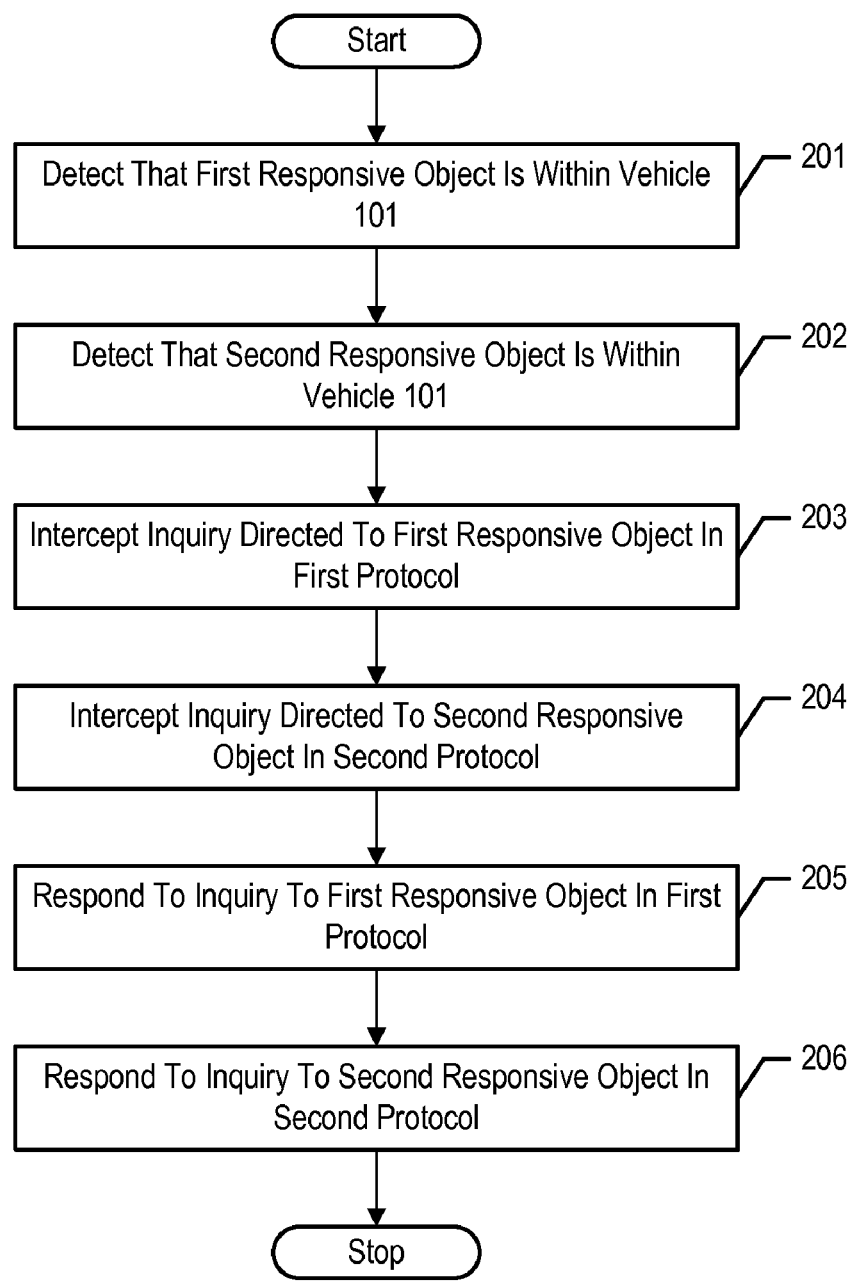
FIG. 2 depicts a flowchart of the salient tasks associated with the operation of the illustrative embodiment of the present invention.

FIG. 2 depicts a flowchart of the salient tasks associated with the operation of the illustrative embodiment of the present invention.

At task 201, location sensor 141 detects the presence of responsive object 111 inside vehicle 101, which indicates that responsive object 111 is unwilling or incapable of responding to inquiries about its own status. It will be clear to those skilled in the art how to make and use embodiments of the present invention that accomplish task 201.

At task 202, location sensor 141 detects the presence of responsive object 112 inside vehicle 101, which indicates that responsive object 112 is unwilling or incapable of responding to inquiries about its own status. It will be clear to those skilled in the art how to make and use embodiments of the present invention that accomplish task 202. In accordance with the illustrative embodiment, tasks 201 and 202 are accomplished serially, but it will be clear to those skilled in the art how to make and use alternative embodiments of the present invention in which tasks 201 and 202 are performed simultaneously or concurrently.

At task 203, proxy 121 intercepts an inquiry directed to responsive object 111, regarding a state of responsive object 111, and in accordance with a first protocol. In accordance with the illustrative embodiment of the present invention, the inquiry is transmitted to proxy 121 via wireless telecommunications.

At task 204, proxy 121 intercepts an inquiry directed to responsive object 112, regarding a state of responsive object 112, and in accordance with a second protocol. In accordance with the illustrative embodiment of the present invention, the inquiry is transmitted to proxy 121 via wireless telecommunications. In accordance with the illustrative embodiment, tasks 203 and 204 are accomplished serially, but it will be clear to those skilled in the art how to make and use alternative embodiments of the present invention in which tasks 203 and 204 are performed simultaneously or concurrently.

At task 205, proxy 121 responds to the inquiry for responsive object 111 with the state of vehicle 101 in accordance with the first protocol. For example, if the inquiry to responsive object 111 requests the temperature of responsive object 111, proxy 121 responds with the temperature of vehicle 101 (as measured by temperature sensor 143) in accordance with the first protocol. In accordance with the illustrative embodiment, the operation of proxy 121 is invisible to transmitter of the inquiry, but it will be clear to those skilled in the art, after reading this disclosure, how to make and use alternative embodiments of the present invention in which the operation of proxy 121 is made known to the transmitter of the inquiry.

At task 206, proxy 121 responds to the inquiry for responsive object 112 with the state of vehicle 101 in accordance with the second protocol. For example, if the inquiry to responsive object 112 requests the location of responsive object 112, proxy 121 responds with the location of vehicle 101 (as measured by location sensor 141) in accordance with the second protocol. In accordance with the illustrative embodiment, the operation of proxy 121 is invisible to transmitter of the inquiry, but it will be clear to those skilled in the art, after reading this disclosure, how to make and use alternative embodiments of the present invention in which the operation of proxy 121 is made known to the transmitter of the inquiry. In accordance with the illustrative embodiment, tasks 205 and 206 are accomplished serially, but it will be clear to those skilled in the art how to make and use alternative embodiments of the present invention in which tasks 205 and 206 are performed simultaneously or concurrently.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus, comprising:
   a vehicle;
   a first responsive object configured to respond to a first inquiry about a state of the first responsive object, wherein the first inquiry is formatted in accordance with a first protocol;
   a first sensor configured to sense when the first responsive object is within the vehicle;
   a second sensor configured to sense a first state of the vehicle;
   a proxy configured to send a first response to the first inquiry directed to the first responsive object about the state of the first responsive object with the first state of the vehicle, using the first protocol, when the first responsive object is within the vehicle, wherein the first response does not include information from the first responsive object;
   a second responsive object configured to respond to a second inquiry about the state of the second responsive object, wherein the second inquiry is formatted in accordance with a second protocol that is different from the first protocol;
   wherein the first sensor is further configured to sense when the second responsive object is in the vehicle; and
   wherein the proxy is further configured to send a second response to the second inquiry directed to the second responsive object about the state of the second responsive object with the first state of the vehicle, using the second protocol, when the second responsive object is within the vehicle, wherein the second response does not include information from the second responsive object.

2. The apparatus of claim 1, further comprising a third sensor configured to detect a second state of the vehicle.

3. The apparatus of claim 1, wherein the first state of the vehicle is location.

4. The apparatus of claim 1, wherein the first state of the vehicle is temperature.

5. The apparatus of claim 1, wherein the first state of the vehicle is humidity.

6. The apparatus of claim 1, further comprising
   a third responsive object configured to respond to a third inquiry about the state of the third responsive object, wherein the third inquiry is formatted in accordance with the first protocol;
   wherein the first sensor is further configured to sense when the third responsive object is in the vehicle; and
   wherein the proxy is also configured for responding to a third inquiry about the state of the third responsive object when the third responsive object is within the vehicle.

7. The apparatus of claim 1, wherein the first responsive object includes a third sensor configured to sense the state of the first responsive object, and wherein the first response sent by the proxy does not include information from the third sensor.

* * * * *